(No Model.)
O. KALKHOFF.
COMBINED TUBE CUTTER AND RATCHET DRILL.
No. 374,969. Patented Dec. 20, 1887.
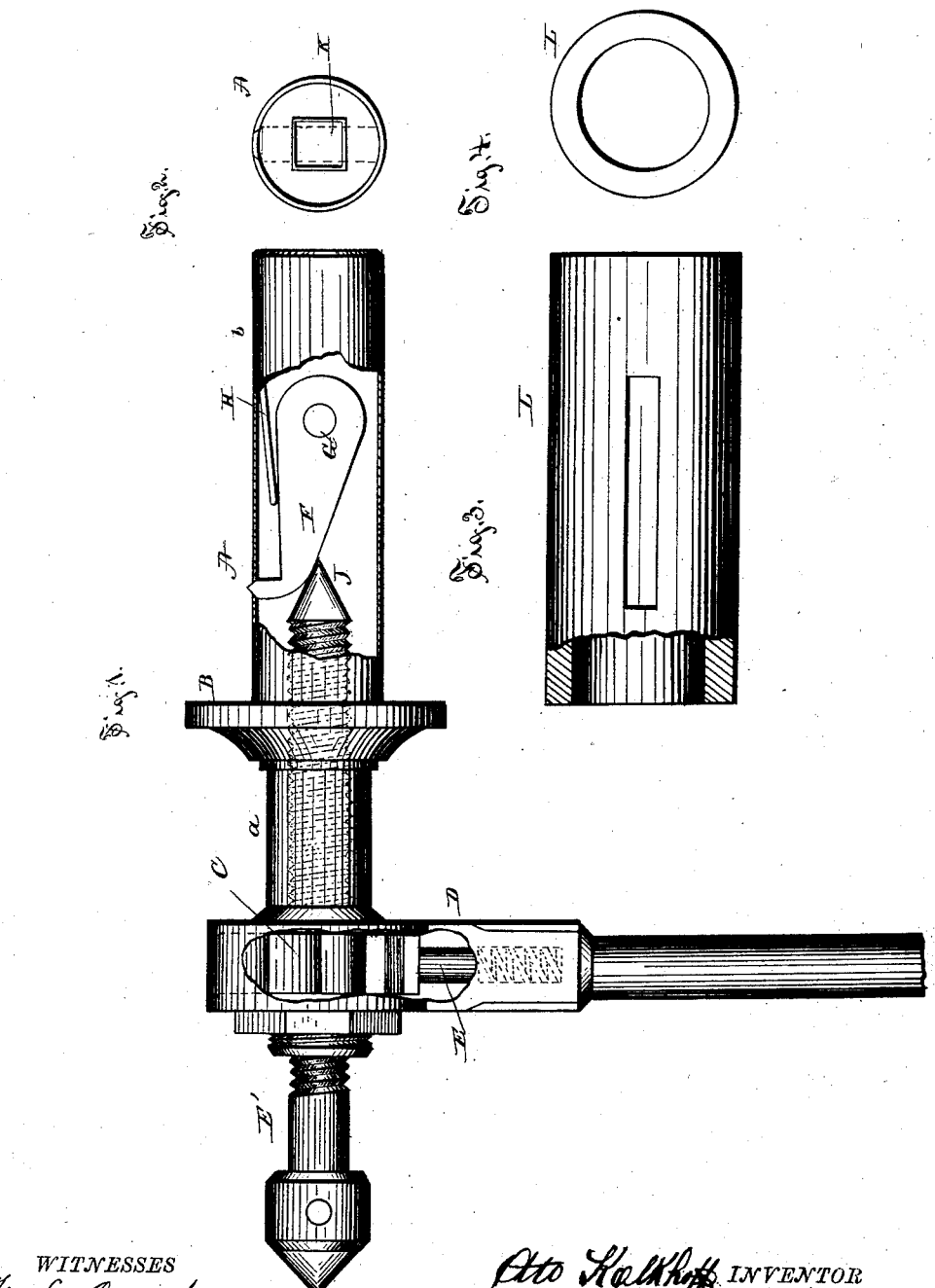
WITNESSES
Otto Kalkhoff INVENTOR
Frank A. Fouts
Attorney

UNITED STATES PATENT OFFICE.

OTTO KALKHOFF, OF CARROLLTON, ILLINOIS, ASSIGNOR OF ONE-HALF TO LEVERETT W. LOOMIS, GEORGE W. ROSS, AND CHARLES E. UNDERWOOD, ALL OF SAME PLACE.

COMBINED TUBE-CUTTER AND RATCHET-DRILL.

SPECIFICATION forming part of Letters Patent No. 374,969, dated December 20, 1887.

Application filed December 9, 1886. Serial No. 221,148. (No model.)

*To all whom it may concern:*

Be it known that I, OTTO KALKHOFF, a citizen of the United States, residing at Carrollton, in the county of Greene, State of Illinois, have invented certain new and useful Improvements in a Combined Tube-Cutter and Ratchet-Drill, of which the following is a specification, reference being had therein to the accompanying drawings.

This invention relates to a combined cutting and boring tool for the use of machinists and others; and it has for its objects to provide a tool which may be used at will as a cutter for cutting off the ends of boiler or other tubes, or a drill-stock, as more fully hereinafter specified. These objects I attain by the means illustrated in the accompanying drawings, in which—

Figure 1 represents a side elevation of my tool complete, having a portion broken away to show the cutting mechanism; Fig. 2, an end view thereof, showing the socket for the reception of the drill or boring or other similar tool; Fig. 3, a side elevation of a sleeve to be employed when the device is used as a cutting-tool, and Fig. 4 an end view of said sleeve.

In the drawings, A indicates a hollow tube or mandrel, which is provided with a contracted shank, $a$, upon which is mounted, adjustably or otherwise, an annular gage-plate, B, which is confined in position by set-screws when adjustable, and which may be formed with the mandrel when rigid therewith. To the said shank is secured a ratchet-wheel, C, and also a loosely-working lever, D, which is provided with a pawl, E, adapted to work in connection with the ratchet to rotate the mandrel in one direction and leave it idle in the other, in the well-known manner. The shank of the mandrel is screw-threaded internally, and through it extends an advancing-screw, E′, which has the usual head and pointed bearing, the head being provided with apertures for the insertion of a lever to turn said screw. The larger portion, $b$, of the mandrel is hollow, and is provided with a longitudinal slot, through which projects the free end of a cutter, F, which is fulcrumed within the mandrel at G, and is pressed normally inward by means of a flat spring, H, against the conical end J of the advancing-screw which projects into the mandrel. The forward end of the mandrel is provided with a square socket, K, for the end of a drill or other tool.

The letter L indicates a sleeve having a longitudinal slot, which corresponds with the slot in the mandrel, and which is adapted to set over the same, so as to fit it to the internal diameter of the tube to be cut and permit it to turn accurately therein. The longitudinal slot is closed at each end, so that it may be held in position in the tube operated upon by the end of the cutting-tool when the mandrel is inserted in vertical position into the upper end of a tube.

The ratchet-lever and ratchet may be dispensed with and an ordinary wrench used to rotate the tool, in which case a polygonal nut will take the place of the ratchet.

When used as a cutting-tool, the mandrel, with the sleeve set over it, is inserted in the tube, the advancing-screw turned so as to throw the cutting-edge of the cutter into contact with the interior of the tube, and the tool is rotated, the advancing-screw being set forward from time to time to advance the cutter until the tube is cut through. When used as a boring-tool, the sleeve is left off and a drill is placed in the socket in the mandrel and the tool operated in the usual manner.

Having described my invention, what I claim is—

1. In a combined tube-cutter and drill, the combination, with the hollow mandrel having an aperture in its forward end adapted to receive and hold a drill-tool, and having at its rear end a pointed advancing-screw, E′, of a cutter mounted in the mandrel and adapted to be projected laterally therefrom, and an inclined or conical head upon said screw at its forward end, whereby the cutter may be advanced laterally or the mandrel longitudinally, substantially as set forth.

2. In a combined tube-cutter and drill, the combination, with the hollow mandrel and the cutter adapted to be laterally projected therefrom, of the removable sleeve L, adapted to closely fit the mandrel externally, and having an aperture for said cutter, the aperture being closed at each end, substantially as set forth.

In testimony whereof I affix my signature in presence of two witnesses.

OTTO KALKHOFF.

Witnesses:
ED MINER,
F. M. ROBERTS.